United States Patent [19]

Mcneff

[11] Patent Number: 5,518,750
[45] Date of Patent: *May 21, 1996

[54] FEED GRAIN CONDITIONING COMPOSITION AND METHOD OF TEMPERING FEED

[75] Inventor: Larry C. Mcneff, Hopkins, Minn.

[73] Assignee: SarTec Coporation, Anoka, Minn.

[ * ] Notice: The term of this patent shall not extend beyond the expiration date of Pat. No. 5,139,779.

[21] Appl. No.: 341,701

[22] Filed: Nov. 18, 1994

Related U.S. Application Data

[63] Continuation of Ser. No. 92,137, Jul. 15, 1993, abandoned, which is a continuation of Ser. No. 654,377, Sep. 26, 1984, Pat. No. 5,279,838.

[51] Int. Cl.$^6$ .............................. A23K 1/00; A23L 1/164
[52] U.S. Cl. .......................... 426/507; 426/511; 426/623; 426/635
[58] Field of Search .............................. 426/2, 630, 633, 426/635, 507, 511, 518, 564, 807, 623; 514/461, 462, 26; 424/195.1; 536/6.3

[56] References Cited

U.S. PATENT DOCUMENTS

| | | |
|---|---|---|
| 282,032 | 7/1883 | Alpaugh . |
| 2,054,026 | 9/1936 | Steindorff et al. . |
| 2,163,628 | 6/1939 | Pilkey . |
| 2,237,798 | 4/1941 | Thomas . |
| 2,301,787 | 11/1942 | Nord . |
| 2,324,874 | 7/1943 | Peters . |
| 2,715,122 | 8/1955 | Rothman . |
| 2,785,107 | 3/1957 | Krider . |
| 2,895,953 | 7/1959 | Wall . |
| 3,144,337 | 8/1964 | McKeen et al. .......................... 514/172 |
| 3,438,780 | 4/1969 | Singer . |
| 3,547,081 | 12/1970 | Geerlings . |

(List continued on next page.)

FOREIGN PATENT DOCUMENTS

| | | |
|---|---|---|
| 1140059 | 1/1960 | Germany . |
| 58-051851 | 3/1983 | Japan . |
| 1102821A | 7/1984 | U.S.S.R. . |
| 2040945 | 9/1980 | United Kingdom . |
| 2118017 | 10/1983 | United Kingdom . |

OTHER PUBLICATIONS

*The Merck Index*, Tenth Edition, 1983.

Article entitled "The Value of Certain Steroidal Sapogenins in Rations of Fattening Lambs and Cattle" by W. H. Hale, W. C. Sherman, W. M. Reynolds and H. G. Luther, *P.S.E.B.M.*, 1961, vol. 106, pp. 486–489.

Book entitled "Yuccas of the Southwest", Agriculture Monograph No. 17, U.S. Department of Agriculture, by John Milton Webber, 1953.

Article entitled "The effect of sarsaponin on digestion and feedlot performance of steers fed high grain diets" by Dr. S. Richard Goodall, *Feedstuffs*, Aug. 24, 1980.

Article entitled "Effect of Dioctyl Sodium Sulfosuccinate Feedings on Rat Colorectal 1,2 Dimethylhydrazine Carcinogenesis", David A. Karlin, M. D., Robert T. O'Donnell, B. S., and Wesley E. Jensen, Ph.D, *JNCL*, vol. 64, No. 1, Apr. 1980.

Article entitled "Broiler Performance with DSS40 Yucca Saponin in Combination with Monesin", by N. L. Johnston, C. L. Quarles, and D. J. Fagerberg, *Poultry Science*, 1982, vol. 61, pp. 1052–1054.

Article entitle "Chronic Oral Toxicities of Surface–Active Agents", by O. Carth Fitzhugh and Arthur A. Nelson, *Journal American Pharmaceutical Association*, 1948, vol. 37, pp. 29–32.

Article entitled "Evaluation of Yucca Saponin on Broiler Performance and Ammonia Suppression", by N. L. Johnson, C. L. Quarles, D. J. Fagerberg, and D. D. Caveny, *Poultry Science*, 1981, vol. 60, pp. 2289–2292.

Abstract of apper entitled "Effects of Sarsaponin in Growing–Finishing Swine Diets" by J. R. Foster, prepared for 16th Annual Meeting Midwestern Section of the American Society of Animal Science, Mar. 21–23, 1983, Chicago, Illinois.

Thesis entitled "Sarsaponin Effects Upon Ruminant Digestion and Feedlot Performance" by S. Richard Goodall, Department of Animal Sciences, Colorado State University, Fort Collins, Colorado, Fall, 1979.

Article entitled "Effect of Dioctyl Sodium Sulfosuccinate on Structure and Function of Rodent and Human Intestine" by D. R. Saunders, M. D., J. Sillery, and D. Rachmilewitz, M. D., *Gastroenterology*, vol. 69, No. 2, pp. 380–386.

Paper entitled "Yucca Schidigera Extract Effect on Egg Production and House Ammonia Levels" by L. O. Rowland, Jr., J. E. Plyler, and J. W. Bradley, presented State University.

Article by David Hest, *The Farmer/The Dakota Farmer*, Nov. 7, 1981.

Article entitled "Feed Additive helps Cattle Pull More Nutrition from Rations", *BEEF*, Sep., 1983.

Article entitled "Sarsaponin and Rumensin: A duo to replace DES" by Nita Effertz, *Farm Journal/Beef Extra*, Aug. 1980.

Article entitled "Sarsaponin makes cents (sense)", by Nita Effertz, *Farm Journal/Beef Extra*, Feb. 1982, p. 20.

Article entitled "Yucca Saponin Explained as 'That ' Litter Deammoniant", by Rod Smith, *Feedstuffs*, Feb. 4, 1980.

*Primary Examiner*—Michael W. Ball
*Assistant Examiner*—Daniel Stemmer
*Attorney, Agent, or Firm*—Merchant, Gould, Smith, Edell, Welter & Schmidt

[57] ABSTRACT

A feed grain conditioning composition including an aqueous tempering agent including a Yucca extract containing saponin and an antifreeze agent. Preferably, the Yucca extract contains sarsasaponin. The antifreeze agent is preferably selected from the group consisting of calcium chloride and propylene glycol. In a preferred embodiment, the amount of antifreeze agent is sufficient to depress the freezing point of the tempering agent to about −30° F. or less. A method of tempering feed grain by applying the feed grain conditioning composition to feed grain is also disclosed.

5 Claims, No Drawings

U.S. PATENT DOCUMENTS

| | | |
|---|---|---|
| 3,583,914 | 6/1971 | Garvin et al. . |
| 3,598,746 | 8/1971 | Kaniecki et al. . |
| 3,615,653 | 10/1971 | Fults .................................. 426/623 |
| 3,682,653 | 8/1972 | Mommer . |
| 3,717,086 | 2/1973 | Hough . |
| 3,721,179 | 3/1973 | Applegate . |
| 3,734,777 | 5/1973 | Bratschitsch . |
| 3,932,736 | 1/1976 | Zarow et al. . |
| 4,055,673 | 10/1977 | Mueller et al. . |
| 4,223,045 | 9/1980 | Fink . |
| 4,542,031 | 9/1985 | Nakajima et al. . |
| 4,657,766 | 4/1987 | Goodall ................................ 426/655 |
| 4,772,479 | 9/1988 | Goodall ................................ 426/655 |
| 4,828,860 | 5/1989 | Goodall ................................ 426/655 |
| 5,139,779 | 8/1992 | McNeff ................................ 426/655 |
| 5,240,727 | 8/1993 | McNeff ................................ 426/636 |
| 5,279,838 | 1/1994 | McNeff ................................ 426/630 |

FEED GRAIN CONDITIONING COMPOSITION AND METHOD OF TEMPERING FEED

This is a continuation of application Ser. No. 08/092,137, filed Jul. 15, 1993, now abandoned which is a continuation of application Ser. No. 06/654,377, filed Sep. 26, 1984 which is issued as U.S. Pat. No. 5,279,838.

FIELD OF THE INVENTION

This invention is directed to a feed grain conditioning composition and a method for tempering feed grains for livestock in association with other processing, or for both tempering and adding digestive benefits to the grain. More specifically, the invention is directed to a method for processing feed grains by the addition of wetting agents such as saponins, preferably sarsasaponins, extracted from Yucca plants.

BACKGROUND OF THE INVENTION

Animal scientists and cattle feeders have evolved numerous grain processing methods in an attempt to optimize the efficiency of animal growth per unit of grain fed. Some of the methods employed in processing feed grains are grinding, rolling, reconstituting, and steam flaking. Water is often added as a tempering agent before or during the processing by direct liquid application and/or as steam. Processing is disruptive to the grain kernel organization. Grinding and rolling reduce the particle size of the grain kernels. Steam flaking, micronizing (dry heating) and reconstitution disrupt the microscopic integrity of the kernel structure. Animals masticate grain kernels mixing the feed with saliva as they do so. Digestion of the feed takes place at the sub-microscopic level and involves the biochemical breaking of molecular structures. Macroscopic and microscopic disruption of the kernel, along with wetting, are predigestive steps which can be achieved by the mechanical and physical processing techniques already described. By achieving the predigestive disruption prior to feeding the feedstuffs, the amount of feed required to produce a unit of animal body tissue is reduced. Fuel efficiency is increased.

Feed processing is an added cost to the feedstuff due to the cost of energy expended, equipment maintenance, person hours, etc. Processing is economically feasible only when the increased cost of the feedstuff is more than offset by the reduced pounds of the feedstuff required to yield a pound of animal weight gain. Energy requirements of processing contributes much of the added cost. Steam flaking represents one of the most costly processing methods employed on a large scale in beef cattle feeding operations. Steam flaking also effects the largest increase in feed efficiency. The quantity of steam injected into the feed is minimized and the through-put (tons per hour) is maximized to hold down the added cost. Wetting agents are used to facilitate the absorption of moisture into the grain. A flaking aid, such as a wetting agent, is employed by a large majority of feedlots.

Saponins in general and sarsasaponins, and their sapogenin and sarsasapogenin derivatives, are well known substances (*The Merk Index*, Tenth Edition, Monographs Nos. 4509, 8215, 8218, 8228 and 8393). Saponins are known to be wetting agents. They have not been employed as flaking aids or otherwise in the treatment of grain for processing. Sarsasaponins are a special class of saponins. The sarsasaponins contain asteroid whereas other saponins do not. The steroid portion of saponins (sapogenins) are not wetting agents. Steroids are fat soluble, making them ideally suited for promoting moisture penetration of oil containing feed grains, most of which are protected by a wax-like coating. Steroids (sapogenins) are not readily soluble in water. Saponins are polar, readily water soluble, and reduce the surface tension of water and exhibit the classic Characteristics of wetting agents.

Sarsasaponins are known to enhance gain and feed efficiency when incorporated into the rations of feedlot cattle. It is one of the sarsasaponins extracted from the plants of the family: Lillaecae, genus: Yucca to increase the rate of moisture uptake by feed grains prior to and during processing. It is a further objective of this invention to introduce sarsasaponins into the rations without destruction of their chemical characteristics, thus leaving them intact in the diet where they may serve as feed and gain enhancers. The increase in feed efficiency due to the addition of sarsasaponins during processing of the feed grain is at least as great as that which has been demonstrated when they are introduced into the ruminant diet by inclusion in protein supplements.

THE PRIOR ART

Hale et al (Proc. Soc. Exp. Biol. Med. 106:486, 1961) have demonstrated that the steroid portions (sapogenins) of some of the sarsasaponins improve gain and feed efficiency when included in the diets of ruminant animals.

McKeen et al (Pfizer U.S. Pat. No. 3,144,337) disclose among others that sarsasaponins, in the form of its glycoside sarsasaponin, may be admixed with a component (grain) of an animal's feed in amount from 0.1 to 24 grams per ton of feed to promote animal growth. However, use of saponins is discouraged because of possible toxicity of saponins. Use of sapogenins is advised. Sapogenins are not readily soluble in water and are not wetting agents. Accordingly, McKeen et al do not and cannot rely on the non-existent wetting agent property of their sapogenins in achieving their claimed stimulated animal growth. Since they advise against use of saponins, there is no accidental or inherent use of the wetting agent property of sarsasaponin. The biological activity of sapogenins is not a function of a wetting agent.

SUMMARY OF THE INVENTION

Broadly stated, the invention comprises the method of processing livestock animal feed grains which comprises adding a small but effective amount of a sarsasaponin to the grain as a wetting agent in association with mechanical processing of the grain. The preferred sarsasaponin is extracted from the Yucca plant of the family Lillaecae. The sarsasaponin may be added at two weight levels, a lower level for its wetting agent and tempering functions, or a higher level for enhancing the digestibility of the grain in addition to its wetting agent and tempering functions. For thorough uniform admixture, the sarsasaponin is desirably added to the grain form a liquid aqueous medium, preferably including an antifreeze agent. Typical mechanical processing steps to which the grain is subjected includes, grinding or rolling to disrupt the kernel organization, steam flaking to add moisture, and mixing with other feed ingredients and components. Although the wetting agent is preferably added prior to mechanical processing, it may be added at any stage in the preparation of the grain for feeding.

DETAILED DESCRIPTION OF THE PREFERRED EMBODIMENTS

The addition of sarsasaponin to feed grain for livestock animals performs two functions. It acts as a wetting agent to facilitate the addition of moisture to render the feed more palatable, more digestible and more stable. It also permits faster weight gains with less feed. When applied in preferred liquid form, a more uniform distribution is assured increasing the chance of uniform sarsasaponin intake. Ration sorting, which often occurs with pelleted supplements, is eliminated. All cattle or other livestock in the pen are exposed to sarsasaponin's special increased feed efficiency benefits. For feed grain processing sarsasaponins are unique in providing both improved wetting agent function and benefits to improved feed conversion in a single project. The introduction of the sarsasaponins prior to processing by steam flaking, dry rolling, etc. with the unexpected result of maintaining compound integrity is heretofore unknown. Analytical procedures show that these sarsasaponins exhibit the same chemical characteristics before and after being subjected to feed grain processing methods. The sarsasaponins are more water soluble, and thus are more capable of mitigating the stresses exerted on a microbial fermentation than the sapogenins.

In the preferred form, the sarsasaponins are added to the grain in a liquid medium. An exemplary liquid from of sarsasaponin is sold under the trademark SarTemp by SarTec Corporation of Anoka, Minn. It is prepared by blending an aqueous extract of the plants of the family: Lillaecae, genus: Yucca, or other appropriate Yucca plants containing 10 solids with antifreeze agents such as calcium chloride, propylene glycol, and the like, to depress the freezing point to −30° F. The final concentration of Yucca soluble solids is 8.25%. Its physical data are:

| Bulk Density | 10.4 lbs. per gallon |
| Color | Dark brown |
| Freezing Point | −30° F. |
| Sarsasaponin Content | 390 grams per gallon (3 grams per ounce) |
| pH | 5.5–6.0 |
| Total solids | 33% |
| Water | 67% |

For grain tempering this liquid material is applied at the rate of 3–4 fluid ounces (9 to 12 grams dry weight) per ton of grain. For grain tempering plus sarsasaponin digestive benefits, it is applied at the rate of 5–6.5 fluid ounces (15 to 20 grams dry weight) per ton of grain. Even when applied at the lower grain tempering rate, the growth improving properties of the sarsasaponins are retained in the treated grain, but at a lower level. Lesser amounts of sarsasaponin, as low as 1 gram per ton dry weight may be used but with decreased effectiveness. Larger amounts than 20 grams per ton may also be used, but are not cost effective. It can be added to grain either at the roller mill, before entering the surge bin of the steam flaker, directly to grain before storage, or directly to the mixer. It should be blended with enough water to achieve the desired moisture level in the processed grain. The solution may then be applied as a surface spray.

Shrinkage is a loss incurred while conveying and processing feed grain. Such losses are the result of dust and fines. Not only are these dusts an economic loss of physical property, but they are atmospheric pollutants. Workers in and around the processing facilities and animals consuming such dusty rations are stressed. The fines also tend to blow out of the feed bunk. Sarsasaponins, because of their wetting properties, permit the application of smaller amounts of water than would otherwise be required to reduce the fines and dust problems. If enough water is applied to reduce the dustings, etc., freezing, molding and other physical handling problems arise. By inclusion of the sarsasaponin, less water is required. Shrinkage and pollution can thus be controlled.

Most wetting formulas commercially available as flaking aids contain volatile organic acids (propionic acid) to ensure stability of the formula against spoiling and molding. These volatile acids are corrosive to processing equipment and are released into the atmosphere. Sarsasaponins, in general, and the exemplary SarTemp formulation, specifically, are non-volatile and, therefore, are not lost as corrosive agents into the atmosphere.

Feedlot research has clearly demonstrated the benefits derived when sarsasaponin is introduced directly into cattle rations. More than 10% weight gain has been achieved with more than 2.5% less feed. In steam chest trials, moisture uptake in sarsasaponin treated corn increased as much as 63% to over 300% as compared with untreated grain.

Sarsasaponins useful in the present invention may also be extracted from plants of the family: Amaryllidaccae, genus: Agave, which grows extensively in the southwestern United States and in Mexico.

The invention is further illustrated by the following examples:

Example I

The moisture uptake of treated and untreated corn was measured. A spray dried water soluble extract of the plants of the family: Lillaecae, genus: Yucca, (1.3 grams) was dissolved in water and diluted to a total volume of one liter (Solution SA). One ml of water and one ml of SA were added to 100 g of whole corn and mixed. The sample was then exposed to steam at the prevailing atmospheric pressure for ten minutes and two minutes. Other samples of corn were treated with 2 ml of water and mixed. These samples were also subsequently exposed to steam for 10 and 2 minutes. Increased moisture content as measured by weight increase was determined and listed:

| Weight increase (grams) per 100 g corn | | |
|---|---|---|
| Exposure (Min) | SA | Water |
| 10 | 6.1 | 5.7 |
| 2 | 4.7 | 4.1 |

At 10 minutes exposure the moisture uptake of the sarsasaponin treated samples was 70.2% greater than that of the untreated samples. At 2 minutes exposure and moisture uptake was only 14.6%.

Example II

The moisture uptake of larger samples of treated and untreated corn exposed to greater amounts of sarsasaponin (SA) and water was measured. The corn samples were treated with water or SA and exposed to steam for 2 minutes. The weight increase of the samples were determined and are listed:

| Sample: | Treatment: | | Weight increase: (grams) | |
|---|---|---|---|---|
| Corn (grams) | SA (ml) | Water (ml) | SA | Water |
| 200 | 2 | — | 20.7 | — |
| 200 | — | 2 | — | 11.8 |
| 500 | 5 | — | 23.1 | — |
| 500 | — | 5 | — | 13.7 |

The moisture uptake of the sarsasaponin treated samples was 75.4% and 68.5% greater than the untreated samples of 200 and 500 grams, respectively.

Example III

The moisture uptake of corn samples treated with sarsasaponin from Yucca extract as in Example I (SA) and the proprietary material SarTemp (ST) was compared with untreated samples. A diluted solution of SarTemp (1.39 g/l) was prepared. Corn samples (500 g) were treated with water, SA, or ST and exposed to steam for 2 minutes. The increase in weight was determined and is tabulated:

| Water (ml) | SA (ml) | ST (ml) | Weight increase (grams) |
|---|---|---|---|
| 15 | — | — | .7 |
| 10 | 5 | — | 22.7 |
| 5 | — | 10 | 10.2 |

The moisture uptake of the sarsasaponin extract treated sample was 324% greater than untreated samples. The moisture uptake of the SarTemp treated sample was 145% greater than the untreated sample. However, the SA solution was about 4.5 times more concentrated than the ST solution.

Example IV

The increase in moisture in 500 g samples of corn in a laboratory scale steam chest was between that which was untreated and that treated with SarTemp (ST) was compared in several trials. Liquid ST was added to the corn at the rate of 6.6 ounces per ton equal to 20.1 grams sarsasaponin dry weight per ton of corn. 1% moisture was added to the corn prior to introduction into the steam chamber. The results were as follows:

| Trial | Untreated | ST |
|---|---|---|
| 1 | 2.1 | 3.9 |
| 2 | 1.8 | 5.0 |
| 3 | 3.8 | 4.0 |
| 4 | 2.9 | 4.6 |
| Average | 2.7 ± 0.7 | 4.4 ± 0.5 |
| Difference |  | +1.7 |
| % Increase |  | 62.9 |

Adding sarsasaponin in liquid medium from SarTemp increased moisture approximately 63% over uptake in corn grain by untreated samples.

Example V

The possible effect of steam flaking on the chemical characteristic of sarsasaponin was evaluated. Wheat grain was treated with SarTemp (ST) and processed by steam flaking. A thin layer chromatogram of the butanol extract of ST and wheat (6.6 oz/ton ST) have identical moving concentrations of saponin, relative to the solvent front. Steam flaking has not alerted the chemical characteristic of this saponin fraction of the ST.

Example VI

The performance of steers fed sarsasaponin treated and untreated flaked corn rations was compared in an extensive feedlot test. A total of 40 steers were fed over a period of 130 days. The results of the trial are shown:

|  | Average Weights | |
|---|---|---|
|  | Control | Sarsasaponin |
| Initial weight lbs. | 746 | 746 |
| Final weight lbs. | 1063 | 1095 |
| Total gain lbs. | 317 | 349 |
| Average daily gain lbs. | 2.44 | 2.69 |
| Total air dry feed lbs. | 21.5 | 23.06 |
| Feed/lb. Gain lbs. | 8.19 | 7.96 |

Whereas control group cattle required 8.19 pounds of feed per pound of gain, sarsasaponin-fed cattle required only 7.96 pounds of feed per pound of gain. The sarsasaponin-fed cattle showed 10.1% greater gain which was achieved with only 97.2% as much feed.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A method of processing feed grain for consumption by livestock animals comprising the steps of:

(a) applying an aqueous fluid to the feed grain wherein said aqueous fluid includes a wetting agent consisting essentially of an effective amount of sarsasaponin; and (b) mechanically processing the feed grain.

2. The method of claim 1 wherein the sarsasaponin is extracted from a plant selected from a group consisting of Yucca and Agave.

3. The method of claim 1 wherein the sarsasaponin is extracted from a Yucca plant of the family Lillaecae.

4. The method of claim 1 wherein the sarsasaponin is applied in an amount of from about 1 to about 20 grams dry weight per ton of feed grain.

5. The method of claim 1 wherein the step of mechanically processing the feed grain includes steam flaking the feed grain, wherein the step of steam flaking includes adding moisture to the feed grain by adding steam thereto.

* * * * *